(12) United States Patent
Harkness (10) Patent No.: US 7,813,464 B1
(45) Date of Patent: Oct. 12, 2010

(54) PERMANENT SEAL RING FOR A NUCLEAR REACTOR CAVITY

(75) Inventor: Alexander W. Harkness, Gibsonia, PA (US)

(73) Assignee: Westinghouse Electric Co LLC, Cranberry Township, PA (US)

( * ) Notice: Subject to any disclaimer, the term of this patent is extended or adjusted under 35 U.S.C. 154(b) by 163 days.

(21) Appl. No.: 11/952,358

(22) Filed: Dec. 7, 2007

Related U.S. Application Data (60) Provisional application No. 60/884,707, filed on Jan. 12, 2007, provisional application No. 60/888,347, filed on Feb. 6, 2007.

(51) Int. Cl.
*G21C 13/00* (2006.01)

(52) U.S. Cl. ...................... 376/203; 376/205

(58) Field of Classification Search ................. 376/203, 376/205; 138/89
See application file for complete search history.

(56) References Cited

U.S. PATENT DOCUMENTS

| | | | | |
|---|---|---|---|---|
| 4,170,517 A | | 10/1979 | Meuschke et al. | |
| 4,214,760 A | * | 7/1980 | Godfrey | 277/646 |
| 4,747,993 A | | 5/1988 | Hankinson et al. | |
| 4,753,768 A | * | 6/1988 | Puri | 376/205 |
| 4,904,442 A | * | 2/1990 | Swidwa et al. | 376/203 |
| 4,905,260 A | | 2/1990 | Swidwa et al. | |
| 4,908,179 A | * | 3/1990 | Brookins | 376/203 |
| 5,272,732 A | * | 12/1993 | Chiang | 376/203 |
| 5,323,427 A | | 6/1994 | Hankinson | |
| 5,434,894 A | | 7/1995 | Chiang et al. | |
| 5,633,901 A | * | 5/1997 | Kim et al. | 376/203 |

* cited by examiner

*Primary Examiner*—Rick Palabrica (57) ABSTRACT

A permanent cavity seal ring that replaces the function of the temporary cavity seal ring typically used in narrow thermal expansion gap pressurized water reactors, to seal the gap between the reactor cavity well and the reactor during refueling. The permanent seal ring uses a C-shaped flexure that is shielded by a rigid cantilevered support arm from any accidentally dropped equipment from above in the refueling canal. The construction accommodates the thermal expansion of the reactor vessel while permitting the reactor cavity cooling air to exit the annulus between the vessel and the reactor cavity wall during plant operation, without a significant increase in pressure drop.

3 Claims, 7 Drawing Sheets

PERMANENT SEAL RING FOR A NUCLEAR REACTOR CAVITY

CROSS-REFERENCE TO RELATED APPLICATIONS

This application claims priority to Provisional Application Ser. Nos. 60/884,707, filed Jan. 12, 2007 and 60/888,347, filed Feb. 6, 2007.

BACKGROUND OF THE INVENTION

1. Field of the Invention

This invention relates to nuclear reactor containment arrangements, and more particularly to permanent seal rings extending across an annular thermal expansion gap between a peripheral wall of a nuclear reactor vessel and a containment wall wherein the seal ring provides a water tight seal across the expansion gap allowing for lateral and vertical translation of the reactor vessel relative to the containment wall.

2. Description of the Prior Art

Refueling of pressurized water reactors is an established routine operation carried out with a high degree of reliability. For normal load requirements, refueling is provided approximately every 12 to 22 months. The complete refueling operation normally takes approximately four weeks.

In a number of nuclear containment arrangements the reactor vessel is positioned within a concrete cavity having an upper annular portion above the vessel which defines a refueling canal. The canal is maintained dry during reactor operations; however, during refueling of the nuclear power plant, the canal is filled with water. The water level is high enough to provide adequate shielding in order to maintain the radiation levels within acceptable limits when the fuel assemblies are removed completely from the vessel. Boric acid is added to the water to ensure sub-critical conditions during refueling. At the beginning of the refueling operation, before the refueling canal is flooded, the reactor vessel flange is sealed to the lower portion of the refueling canal. Originally, this seal was achieved by a clamped gasket seal ring which prevents leakage of refueling water to the well in which the reactor vessel is seated. This gasket was fastened and sealed after reactor cool down prior to flooding of the canal. Typically this removable seal ring was made up of four large diameter elastomer gaskets which are susceptible to leakage and must be replaced at each refueling operation.

The annular thermal expansion gap between the reactor vessel and the concrete wall surrounding the reactor vessel is provided to accommodate thermal expansion of the vessel and other vessel movements such as in a seismic event and permit cooling of the cavity walls and the excore detectors embedded within the concrete cavity walls. Pressurized water reactor plants have two basic expansion gap sizes, i.e., wide and narrow. The wide gaps tend to be in the range of two to three feet, while narrow gaps tend to be in the range of two to four inches. In all plants, the gap area must be sealed during refueling. While the upper portion of the cavity, i.e., the refueling canal may be flooded, no water is permitted in the lower portion of the cavity. Typically, the reactor vessel has a horizontally extending flange and the containment wall surrounding the reactor cavity has a horizontally extending ledge or shelf at the floor of the refueling canal at about the same elevation as the flange, which the temporary seal ring spanned during refueling.

In plants with wide thermal expansion gaps permanent seal rings such as those described in U.S. Pat. Nos. 5,323,427; 4,905,260; 4,904,442; 4,747,993; and 4,170,517 have been employed to reduce the time required for the refueling operation. However, permanent seal rings need to allow for thermal expansion of the reactor vessel that reduces the gap between the peripheral wall of the reactor vessel and the containment wall in the area of the reactor well, and also ideally accommodate some vertical and lateral movement of the reactor vessel relative to the containment wall. In addition, the seal ring should be able to withstand heavy blows from objects such as fuel assemblies, accidentally dropped during refueling. A permanent seal ring also must permit the passage of cooling air from the lower reactor cavity along the wall surrounding the vessel up to the refueling canal. Thus, the seal ring must have (1) strength to retain the large volume of water used in the refueling operation; (2) flexibility to accommodate movement of the reactor vessel within the containment wall; (3) structural integrity to resist damage from falling objects; and (4) an air path between the lower reactor cavity and the refueling canal for cooling of the cavity walls during reactor operation. The foregoing patents describe various designs that achieved these objectives for wide gap plants; however, do not satisfy all of these objectives for narrow expansion gap plants. There are approximately 40 plants in the United States that have narrow expansion gaps that could take advantage of a permanent seal fixture if a design was available that could achieve all of the foregoing objectives.

Accordingly, it is an object of this invention to provide such a design that will satisfy all of the foregoing objectives for narrow expansion gap plants.

SUMMARY OF THE INVENTION

The foregoing objectives are achieved by employing an annular stainless steel ring which sealingly engages and is affixed to and extends between the refueling ledge adjacent the reactor vessel flange and the containment wall at the floor of the refueling canal. The annular ring seal includes a rigid cantilevered annular support that is anchored at a first end to one of the floor of the refueling canal or the refueling ledge and extends above and over the expansion gap preferably extending over at least a portion of the other of the floor of the refueling canal or the refueling ledge. A distal portion of the rigid cantilevered annular support has one end of a generally C-shaped flexure member attached thereto. Another end of the C-shaped flexure member is anchored to the other of the floor of the refueling canal or the refueling ledge.

In the preferred embodiment the rigid cantilever annular support includes a substantially horizontal foot that is anchored to one of either the floor of the refueling canal or the refueling ledge. A leg having one end connected to the foot extends from the foot in a generally vertical direction and is attached at an elevation spaced from the foot to an arm or top plate which extends laterally out in a generally radial direction over the expansion gap. Desirably the arm or top plate extends radially in a horizontal direction. Preferably, the foot extends from the leg radially toward the expansion gap and is bolted to the surface on the one of the floor of the refueling canal or the refueling ledge. A seal weld is supplied around the interface between the rigid cantilevered annular support and the one of the floor of the refueling canal or the refueling ledge. Alternately, the foot can be attached by a structural weld.

In an alternate embodiment, an end of the arm opposite the distal end that extends over the expansion gap, extends radially past the leg and is attached to a distal end of an L shaped flexure member that has another end anchored to the one of the floor of the refueling canal or the refueling ledge. In still another embodiment the first end of the generally C-shaped flexure member is attached to the rigid cantilevered annular support through a substantially vertically extending flexure link.

The embodiments of this invention thus permit hatch openings to be placed in the arm or top plate of the rigid cantilevered annular support of sufficient size as to not add additional constrictions to the cooling air flow in a narrow gap plant arrangement, without sacrificing the structural strength and flexibility of the seal.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

This invention provides a nuclear reactor vessel to cavity seal arrangement that forms a permanent flexible seal between the reactor vessel and the reactor refueling canal floor that is capable of being used in nuclear plants that have a narrow expansion gap. The design of the seal of this invention will affect a water tight seal for the refueling canal during refueling operations while accommodating material expansions and contractions that occur during normal reactor operations and enable sufficient coolant air flow, without destroying the water tight integrity of the seal.

Figure 1:
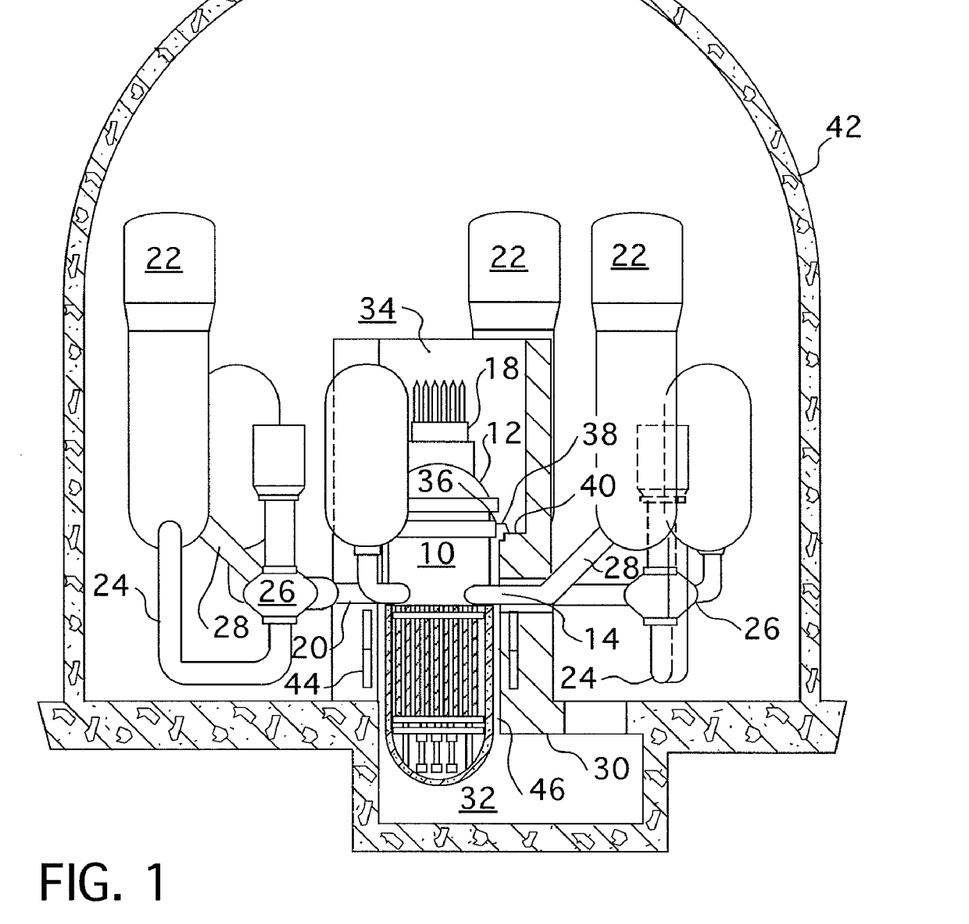
FIG. 1 is a schematic view of the reactor containment, partially in section, incorporating this invention.

The environment in which the invention operates can best be understood by reference to the side view, partially in cross-section, of a reactor containment illustrated in FIG. 1, which shows a nuclear steam generating system of the pressurized water type incorporating the permanent water tight seal ring of this invention. A pressurized vessel 10 is shown which forms a pressurized container when sealed by its head assembly 12. The vessel has cooling flow inlet nozzles 20 and cooling flow outlet nozzles 14 formed integral with and through its cylindrical walls. As is known in the art, the vessel 10 contains a nuclear core (not shown) consisting mainly of a plurality of clad nuclear fuel elements which generates substantial amounts of heat depending primarily upon the position of control means, the pressure vessel housing 18 of which is shown. The heat generated by the reactor core is conveyed from the core by coolant flow entering through inlet nozzles 20 and exiting through outlet nozzles 14.

The flow exiting through outlet nozzles 14 is conveyed through hot leg conduit 28 to a heat exchange steam generator 22. The steam generator 22 is of the type wherein heated coolant flow is conveyed through tubes (not shown) which are in heat exchange relationship with water which is utilized to produce steam. The steam produced by the steam generator 22 is commonly utilized to drive a turbine (not shown) for the production of electricity. The flow is conveyed from the steam generator 22 through cold leg conduit 24 through a pump 26 from which it proceeds through a cold leg conduit to the inlet nozzles 20. Thus, it can be seen that a closed recycling primary or steam generating loop is provided with coolant piping communicably coupling the vessel 10, the steam generator 22, and the pump 26. The generating system illustrated in FIG. 1 has three such closed fluid flow systems or loops. The number of such systems should be understood to vary from plant to plant, but commonly 2, 3 or 4 are employed.

Within the containment 42 the reactor vessel 10 and head enclosure 12 are maintained within a separate reactor cavity surrounded by a concrete wall 30. The reactor cavity is divided into a lower portion 32 which completely surrounds the vessel structure and an upper portion 34 which is commonly utilized as a refueling canal. During reactor operation air flow communication is maintained between the lower reactor vessel well 32 and the refueling canal 34 to assist cooling of the concrete walls of the reactor cavity and the excore detectors 44 embedded within the concrete walls. The air flow is facilitated by exhaust fans positioned within the containment 42 outside of the concrete barrier 30. During refueling operations the reactor vessel flange 36 is sealed to the reactor cavity shelf 40 which is the floor of the refueling canal. In FIG. 1 a wide expansion gap 46 is shown for clarity. For plants with such wide gaps 46 permanent seal rings of the type previously described would normally be employed. By placing a fixture over the gap 46 the heat emanating around the reactor vessel is constricted. For a wide gap plant having an annulus width in the order of three feet the permanent seal fixture designs generally use welded, flexible steel pieces on the side, with several large hatches on a top steel plate. Before refueling, the hatches are locked into position to create a water tight seal. After the refueling canal is drained, the hatches are removed and stored to allow air flow during standard operation.

Because the wide gaps are large, sizing and placing hatches to allow for adequate air flow is relatively easy. However, the narrow gaps are so small that hatches become a limiting design factor. Without enough hatches, the air flow during reactor operation is significantly constricted. Of particular concern is the structural strength of the permanent seal fixture. One wide gap seal fixture that is commonly used is shown in U.S. Pat. No. 4,904,442, which employs two steel legs supporting a rigid top plate. Attached to a top plate on either side are two L-shaped flexures. The main structure supports the load, but is not fixed to the refueling ledge or compartment floor. The flexures which are made up of thin sheet metal are the only portion fixed to the refueling ledge and refueling canal floor, creating the water tight seal, while allowing the seal structure to deflect as necessary to accommodate movement of the vessel. The two legs are not welded to the ledge. Instead, the two flexures are welded to the top plate and ledge. This allows the seal structure to have the needed support for dropped load cases such as catastrophic drop of a fuel assembly. However, the structure can also move as needed for expansion due to loads such as operational temperature change and seismic activity.

The largest problem with applying the structure of the wide gap permanent fixture seal to a narrow gap plant is one of heat flow. The two legs and the top plate trap heat. To alleviate this problem the design of this invention removed one leg. In doing so, the remaining leg and top plate were modified to accommodate design structural loads. In addition, a new flexure design was developed that would withstand the movement caused by required design load cases and allow more area to accommodate cooling air flow.

In the design of this invention, the hatches have also become a structural concern because they occupy a good deal of the volume of the top plate. Similar to the wide gap design, hatches are used to allow air flow through the structure during normal operation. However, the hatches for the wide gap structure take up a smaller portion of the top plate than those required for the narrow gap structure. Traditionally, the hatch plates are not as thick as the top plate to which they are attached. This means that in the narrow expansion gap design a significant amount of support material is lost causing more stress reactive sections.

Figure 2:
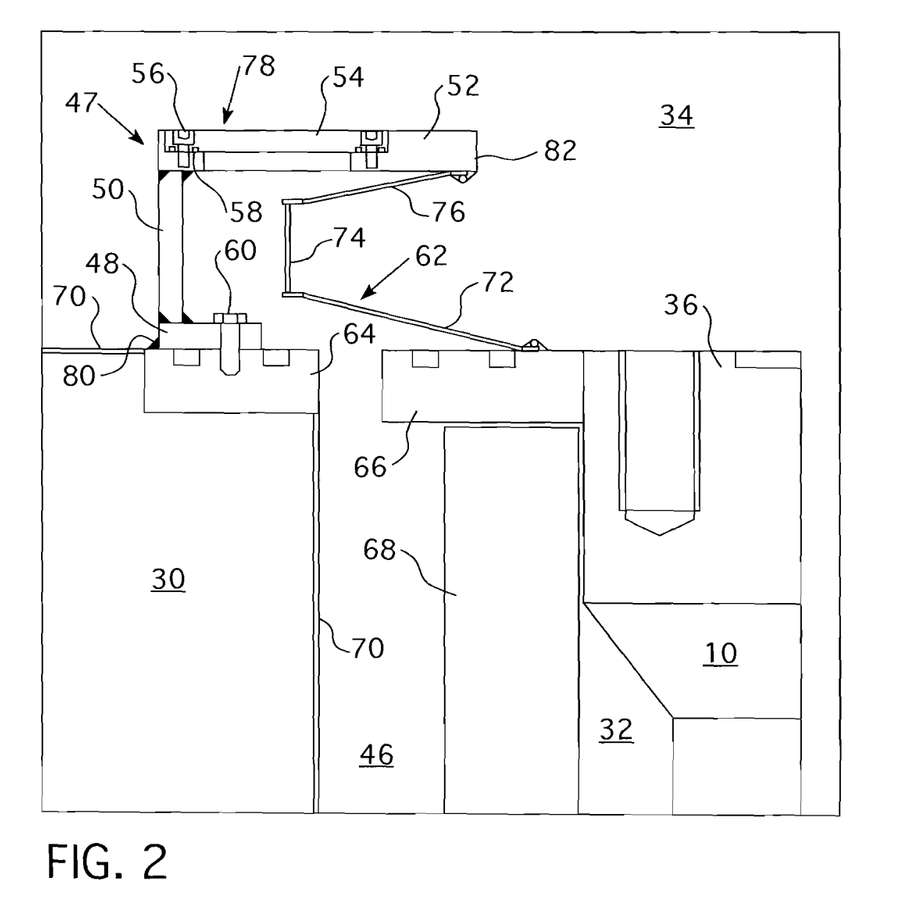
FIG. 2 is a side view of a portion of the reactor well about the thermal expansion gap showing a preferred embodiment of the annular seal ring of this invention.

The narrow expansion gap seal design of this invention installed in the plant refueling configuration, i.e., hatch cover plates installed, is shown in FIG. 2. The reactor vessel 10 is shown centered in the lower portion 32 of the reactor cavity surrounded by insulation 68. A refueling ledge 66 is shown as an extension of the reactor vessel flange 36 and extends radially from the flange 36 towards the containment cavity wall 30 where it defines the cavity thermal expansion gap 46 between the refueling ledge 66 and an embedment plate 64 anchored in the containment wall 30. A steel liner 70 covers the outside of the concrete containment wall. The permanent reactor cavity seal ring of this invention 78 is shown anchored to the embedment plate 64 by bolts 60 which pass through a foot 48 of a cantilevered portion of the seal 78. The foot 48 is welded to one end of a leg portion 50 of the cantilevered section which is in turn welded to a horizontally extending arm or top plate 52, which extends over the expansion gap 46 and, preferably, over at least a portion of the refueling ledge 66. The top plate 52 has a hatch 54 which is held in place by bolts 56 which compress seal rings 58 to create a water tight seal. A seal weld 80 surrounds the intersection of the foot 48 and the embedment plate 64. A flexure member 62 is connected at one end to the arm 52 within the vicinity of the distal end 82 of the arm 52. The flexure member 74 is a generally C-shaped member that is connected at its other end to the upper surface of the refueling ledge 66.

The thin gauge, e.g., less than about 0.2" (0.51 cm) construction of the C-shaped flexure is designed to accommodate the radial and vertical thermal expansion of the reactor vessel. It combines the function of the L-shaped flexures used in the wide gap permanent cavity seal ring described in U.S. Pat. No. 4,747,993. The thin gauge C-shaped flexure is protected from an inadvertent fuel assembly drop by the robust top plate 54. Preferably the permanent reactor cavity seal is constructed out of stainless steel.

Figure 3:
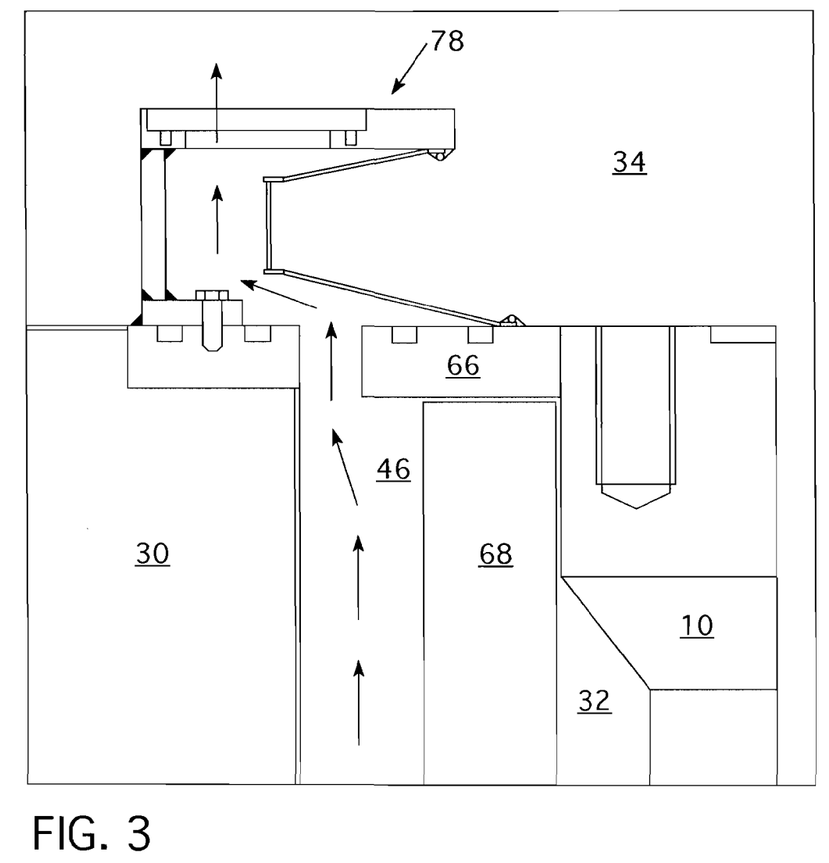
FIG. 3 is a side view of the portion of the reactor weld shown in FIG. 2 illustrating the air path through the seal of one embodiment of this invention.
Figure 4:
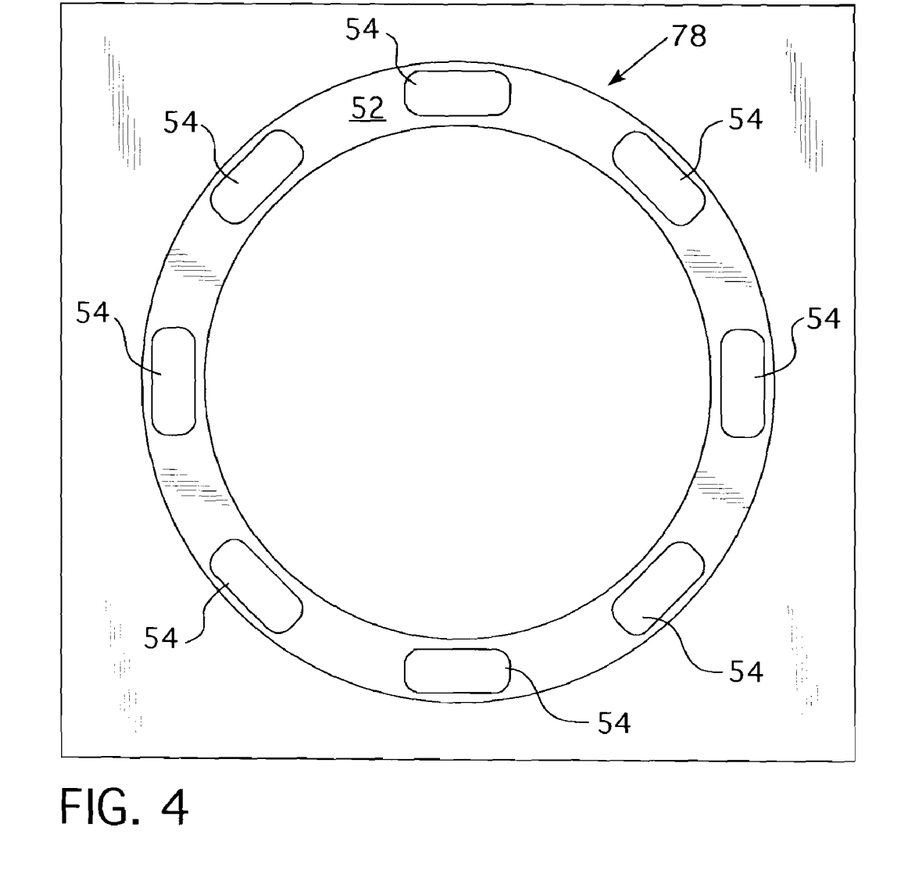
FIG. 4 is a plan view of the permanent cavity seal ring of this invention showing the air hatch placement.

After refueling when the spent fuel canal 34 is drained the air hatches 54 are removed to provide a flow path for the reactor cavity cooling air. FIG. 3 illustrates the cooling air flow path with the hatch cover plates removed during plant operation. FIG. 4 shows a typical orientation of the hatch 54 openings in plan view.

Figure 5:
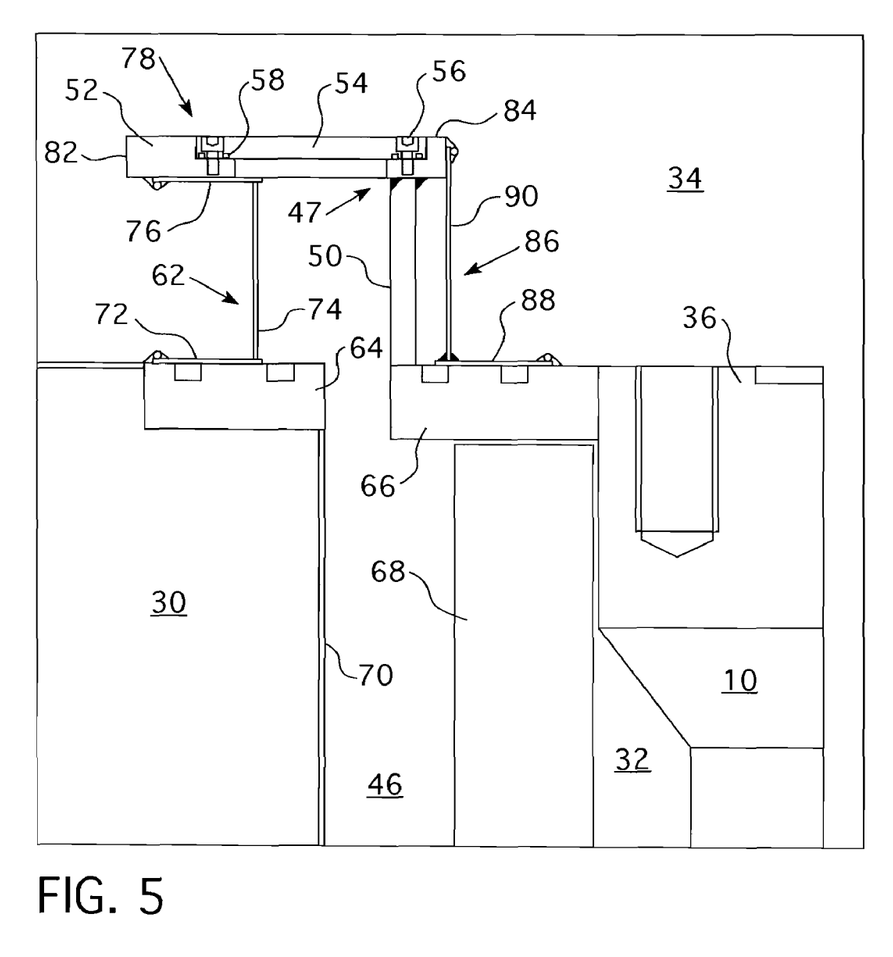
FIG. 5 is a side view of a portion of the reactor containment about the thermal expansion gap that shows a second embodiment of this invention.

An alternate design is illustrated in FIG. 5 which uses a C-shaped outer flexure 74 welded to the refueling cavity embedment ring 64 and an L-shaped inner flexure 86 having a short leg 88 welded to the reactor vessel refueling ledge 66 and a long leg 90 secured to the extended portion 84 of the arm 54. In this embodiment the cantilevered annular support 47 which is made up of the leg 50 and arm or top plate 52 rests on the refueling ledge 66 and the bottom link 72 of the outer C-shaped flexure 62 is secured to the embedment plate 64. Like reference characters are used for the corresponding elements shown in FIG. 5 that are common to both FIGS. 2 and 5. The embodiment shown FIG. 5 differs from that shown in FIG. 2 in several other respects as well. For example, the C-shaped flexure 62 in the embodiment shown in FIG. 5 is facing away from the reactor vessel 10 while in FIG. 2 the C-shaped flexure is facing towards the reactor vessel 10. Furthermore, the arm or top plate 52 in the embodiment shown in FIG. 5 has a segment 84 that extends beyond the leg 50 in a direction away from the C-shaped flexure 62. The inner L-shaped flexure functions similarly to that described in U.S. Pat. No. 4,904,442. The design shown in FIG. 5 shares many of the same attributes as that described above with respect to FIG. 2, but also provides additional flexibility due to the increase total length of the flexure material associated with the combination of two flexures 86 and 62. This design would use a support leg 50 that rests directly on the reactor refueling ledge to provide the required support for the seal ring during refueling operations when the refueling cavity is flooded. The water tight seal is achieved with the fully welded inner and outer flexures 86 and 62.

Figure 6:
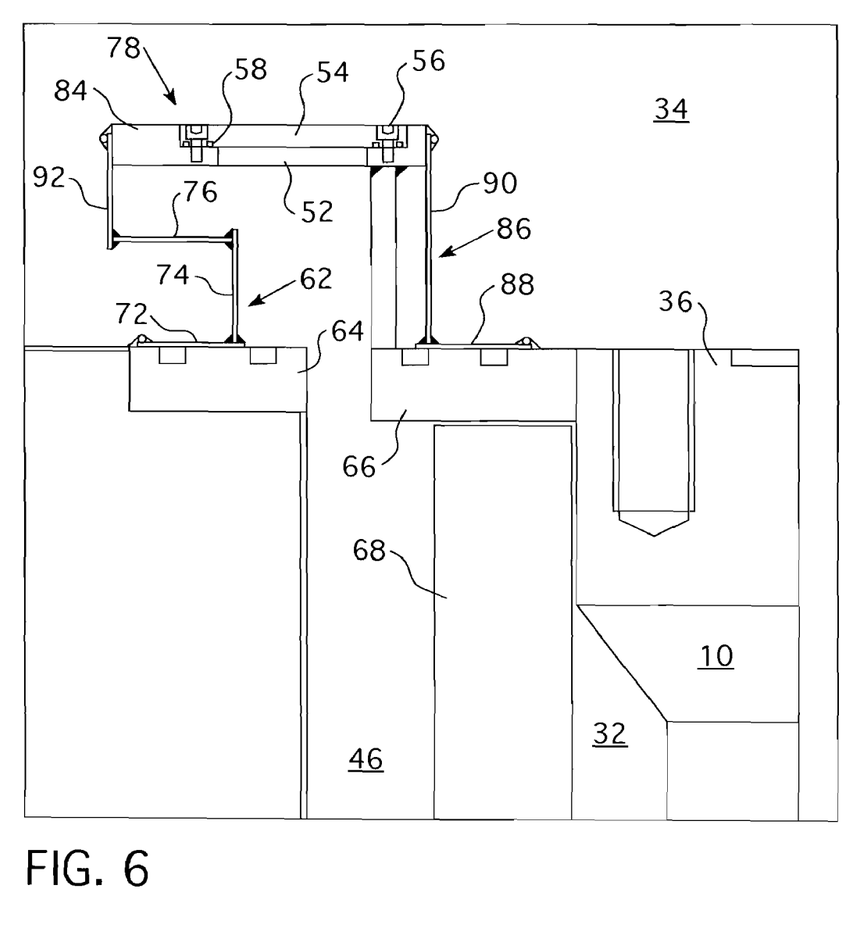
FIG. 6 is a side view of a portion of the reactor containment about the thermal expansion gap illustrating a third embodiment of this invention.
Figure 7:
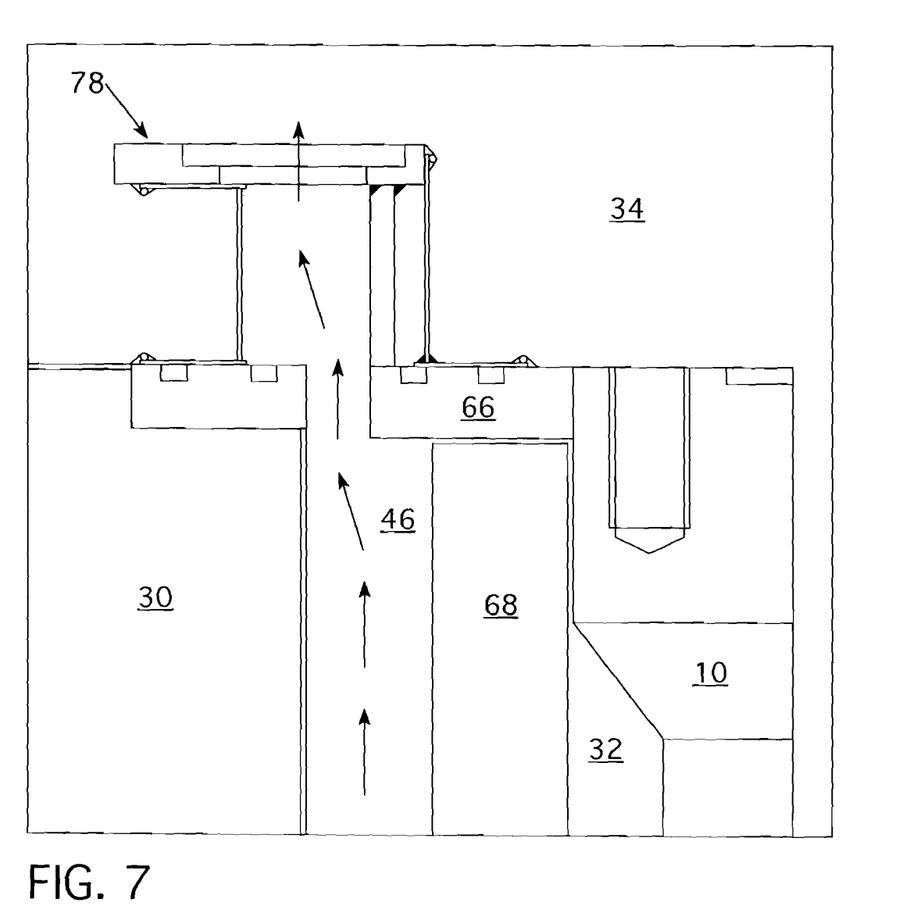
FIG. 7 is a side view of a portion of the reactor containment illustrated in FIG. 5 showing the coolant air path through the permanent cavity seal ring of this invention.

FIG. 6 illustrates an optional design for the outer flexure 62. This design has an added flexure link 92 inserted between the distal end 84 of the horizontal arm 52 and the upper link 76 of the C-shaped flexure 62. The shape of the flexure 62 is modified to allow for a larger hatch 54 thus enabling a larger air opening in the top plate 52. The modified flexure shape shown in FIG. 6 maintains the same flexure characteristics as the C-shaped design shown in FIG. 5. A larger opening may be required for some applications to compensate for the increased pressure drop in the reactor cavity air cooling system associated with the seal ring. FIG. 7 shows the reactor cavity air flow path through the two flexure seal design shown in FIGS. 5 and 6, during plant operation.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention, which is to be given the full breadth of the appended claims and any and all equivalents thereof.

What is claimed is:

1. A nuclear reactor containment arrangement including:
   A. an open ended reactor pressure vessel which thermally expands and contracts during cyclic operation of the reactor and which has a peripheral wall and a flange that mates with a corresponding flange on a reactor vessel head which forms a removable closure for the open ended reactor pressure vessel;
   B. an annular refueling ledge which is an annular, radially outward extension of the reactor pressure vessel flange;
   C. a containment wall spaced apart from and surrounding the peripheral wall of the reactor vessel and defining an annular thermal expansion gap therebetween for accommodating thermal expansion and other movement of the reactor pressure vessel, the containment wall having a plateau which forms a floor of a refueling canal of the nuclear reactor containment; and
   D. an annular ring seal which sealingly engages and is affixed to and extends between the refueling ledge and the containment wall, and comprises:
      (I) a rigid cantilevered annular support that is anchored at a first end to one of (i) the floor of the refueling canal or another surface on the containment wall substantially parallel thereto or (ii) the refueling ledge and extends above and over the expansion gap, completely spanning the expansion gap and having a second, distal end; and (II) a generally "C" shaped flexure member having a first end attached to the rigid cantilevered annular support proximate the distal end and a second end anchored to the other of (i) the floor of the refueling canal or another surface on the containment wall substantially parallel thereto or (ii) the refueling ledge;

said flexure member being disposed below the cantilevered portion of said cantilevered annular support;

wherein the rigid cantilevered annular support includes a substantially horizontal foot that is anchored to the one of (i) the floor of the refueling canal or another surface on the containment wall substantially parallel thereto or (ii) the refueling ledge, a leg having one end connected to the foot, wherein the leg extends from the foot in a generally vertical direction and is attached at an elevation spaced from the foot to an arm which extends out in a generally radial direction over the expansion gap; and wherein a second end of the arm opposite the distal end of the arm that extends over the expansion gap, extends radially past the leg and is attached to a distal end of an "L" shaped flexure member that has another end anchored to the one of (i) the floor of the refueling canal or another surface on the containment wall substantially parallel thereto or (ii) the refueling ledge.

2. The nuclear reactor containment arrangement of claim 1 wherein the first end of the generally "C" shaped flexure member is attached to the rigid cantilevered annular support through a substantially vertically extending flexure link.

3. The nuclear reactor containment arrangement of claim 2 wherein the flexure link is connected to the first end of the generally "C" shaped flexure member at a less than obtuse angle.

* * * * *